United States Patent [19]
Krumhar et al.

[11] Patent Number: 5,731,026
[45] Date of Patent: Mar. 24, 1998

[54] HOMOGENIZED STARCH-BASED CHEESE PRODUCT AND METHODS OF MAKING SAME

[75] Inventors: Kim C. Krumhar, New Milford; Amuerfina Natividad Phillips; Kenneth Richard Moffitt, both of Brookfield; Dominick Damiano, Danbury, all of Conn.

[73] Assignee: Nestec S.A., Vevey, Switzerland

[21] Appl. No.: 710,728

[22] Filed: Sep. 20, 1996

[51] Int. Cl.⁶ .......................... A23L 1/0522; A23C 19/09
[52] U.S. Cl. .......................... 426/589; 426/519; 426/522; 426/582; 426/661
[58] Field of Search .................. 426/661, 589, 426/582, 519, 522

[56] References Cited

U.S. PATENT DOCUMENTS 4,568,555  2/1986  Spanier ........................ 426/578

*Primary Examiner*—Helen Pratt
*Attorney, Agent, or Firm*—Pennie & Edmonds

[57] ABSTRACT

A cheese sauce comprising a water-in-oil emulsion containing, based on the weight of the sauce, from 1 to 25% by weight of cheese and from 3 to 10% by weight of a homogenized modified starch or a mixture of homogenized modified and unmodified starch containing up to 40% by weight of unmodified starch based on the weight of the mixture of the starches.

5 Claims, No Drawings

HOMOGENIZED STARCH-BASED CHEESE PRODUCT AND METHODS OF MAKING SAME

FIELD OF THE INVENTION

The present invention relates to a cheese product and more particularly to a cheese sauce and a method of preparing a cheese sauce.

BACKGROUND OF THE INVENTION

Generally, cheese sauces comprise an oil-in-water emulsion which is stabilized by cheese protein, and more specifically by casein which is the predominant protein in cheese. Optionally, other proteins and emulsifiers may be comprised therein. The sauces are thickened with starch, and modified starch is generally preferred for preparation of low acid heat sterilised sauces which require a severe thermal process. Commercial sterility is thus usually accomplished either through retort or aseptic processing.

Premium quality cheese sauces contain up to 50% cheese and about 3% starch. However, when formulating low cost cheese sauces with reduced cheese and fat content, cheese usage my fall to as low as 5% of the formula weight. Therefore, starch thickener usage is increased to compensate for the cheese solids at a rate of from 0.25 to 0.75% for each 5% reduction in cheese level For example, reducing cheese level from 45% to 10% would require up to 6.5% total starch to achieve texture and viscosity equivalent to 45% cheese sauces with only 3% starch.

A disadvantage of low cheese, high starch sauces has been that they often develop inappropriate short pudding-like consistency and texture in the absence of adequate casein and fat to provide extensibility. Ideally, a cheese sauce should have an extensible, long texture characteristic of melted cheese or pasteurised processed cheese after indirect heating.

A stringy texture can be achieved in low cheese sauces by the use of thermally overprocessed, unmodified waxy cornstarch, but this results in an unpleasantly cohesive and gelatinous texture often described as slimy.

SUMMARY OF THE INVENTION

We have now surprisingly found that a smooth, long and extensible texture resembling that of high cheese content sauces and pasteurized processed cheese can be produced in a shelf-stable, reduced cheese, low to medium fat sauce with high starch levels if the thickener system is homogenized before gelatinization occurs, and the thickener system is comprised of either modified starch or a specified mixture of modified and unmodified starches.

Accordingly, the present invention provides a cheese sauce comprising an oil in water emulsion containing, based on the weight of the sauce, from about 1 to 25% by weight of cheese and from about 3 to 10% by weight of a homogenized modified starch or a mixture of homogenized modified and unmodified starch containing up to 40% by weight of unmodified starch based on the weight of the mixture of the starches.

DETAILED DESCRIPTION OF THE INVENTION

A wide variety of cheeses may be used for the cheese sauce, for example, high flavor cheese blends containing cheddar cheese, enzyme modified cheese, granular cheeses, 3–12 month old block cheddar, cloby cheese, Muenster cheese, Monterrey jack cheese, parmesan, provelone, and Swiss or Emmental cheeses.

The amount of cheese in the sauces according to the present invention depends on specific cost and quality requirements. Least cost formulas are made with a cheese content ranging from, for example, about 2 to 13% by weight based on the weight of the sauce, while the higher quality "premium" formulas call for cheese content ranging from, for example, above 13% up to 30% by weight based on the weight of the sauce.

Preferably, the amount of unmodified starch is present in an amount of at least about 2% by weight. Also, the amount of the homogenized modified starch or the mixture of homogenized modified and unmodified starch in the sauce is from about 4 to 8% by weight based on the weight of the sauce. Preferably, the amount of unmodified starch in the mixture of homogenized modified and unmodified starch is from about 5 to 30% and especially from about 10 to 25% by weight based on the weight of the mixture of the starches.

The starch used may be modified or unmodified waxy maize starch such as those manufactured by National Starch and Chemical Company, Staley Company, Cerestar, Amaizo or American Maize Company. Preferably, the unmodified starch is unmodified, ungelatinised native waxy cornstarch without crosslinking while, preferably the modified starch is comprised of a modified, hydroxypropylated waxy cornstarch having a moderate to high level of phosphorus oxychloride (POC) crosslinking. Other modified or unmodified starches may be used including those obtained from dent corn, tapioca, wheat, rice or potato.

Other ingredients commonly used in cheese sauces well known to those skilled in the art may be present such as proteins and emulsifiers.

The present invention also provides a process for the preparation of a cheese sauce which comprises homogenizing a modified starch or a mixture of modified and unmodified starch containing up to about 40% by weight of modified starch based on the weight of the mixture of the starches, and blending the homogenized starch with cheese and other ingredients of a cheese sauce to produce an oil in water emulsion containing, based on the weight of the sauce, from about 1 to 25% by weight of cheese and from about 3 to 10% by weight of the homogenizing starches.

The present invention further provides a process for the preparation of a cheese sauce which comprises blending a modified starch or a mixture of modified and unmodified starch containing from about 5 to 40% by weight of unmodified starch based on the weight of the mixture of the starches, with cheese and other ingredients of a cheese sauce and homogenizing the blend to produce an oil in water emulsion containing, based on the weight of the sauce, from about 1 to 25% by weight of cheese and from about 3 to 10% by weight of the starches.

The present invention in addition provides a process for the preparation of a cheese sauce which comprises blending a modified starch or a mixture of modified and unmodified starch containing from about 5 to 40% by weight of unmodified starch based on the weight of the mixture of the starches with other ingredients of a cheese sauce except the cheese, homogenizing the blend and blending the homogenized mixture with the cheese to produce an oil in water emulsion containing, based on the weight of the sauce, from about 1 to 25% by weight of cheese and from about 3 to 10% by weight of the starches.

When a mixture of modified and unmodified starch is used, any suitable type of homogenizer may be used at low or moderate pressure, e.g. a colloid mill homogenizer or a high pressure/steam injection homogenizer. If a piston homogenizer is used, the homogenization may be carried out at a moderate pressure, for instance from about 100 to 2000 psi (7 to 140 bar) and at a temperature below the gelatinization temperature of the starch, preferably well below the gelatinization temperature, especially from about 45° to 50° C. When a homogenized all-modified starch is used, preferably a high pressure homogenization below the gelatinization temperature of the starch is employed.

We have found that when the cheese is incorporated into the sauce and homogenized at high pressure, the dominant flavor profile shifts to "buttery" and "dairy" rather than typically cheesy. In contrast, when the same amount of cheese is added with low shear mixing after homogenization, a stronger cheese taste with less buttery flavour is perceived, but without the desired texture. Preferably, low pressure single-stage homogenization of the complete cheese sauce at from about 100 to 500 psi surprisingly produces both the desired stringy sauce texture and cheese flavor profiles approaching those produced previously only by adding cheese after the homogenization step.

EXAMPLES

The following Examples further illustrate the present invention.

Example 1

An aseptic low cost cheese sauce is prepared from the ingredients shown in Table 1 by adding them to the water at 50° C. in a high shear mixer in the following order of addition: The phosphate and citrate are added first followed by the sodium chloride, DATEM esters, carrageenan and cheese and mixed until the cheese is fully dissolved. Oil is added and then starch with 5 minutes blending. Afterwards, the vinegar, colors and flavors are added and mixed until fully homogeneous. The complete mixture is homogenized at 50° C. and 200 psi (14 bar).

Afterwards, the homogenized mixture is processed at 137° C. for a residence time of 20 seconds and cooled to 35° C. and finally filled aseptically to provide a shelf-stable finished cheese sauce product.

TABLE 1

Aseptic low cost cheese sauce

| Ingredient | % of Batch |
| --- | --- |
| Water | 70.0 |
| Cheese | 13.00 |
| Modified waxy maize starch | 6.0 |
| Maltodextrin | 5.15 |
| Soy oil | 4 |
| Salt | 1.2 |
| Unmodified waxy maize starch | 1.0 |
| Disodium phosphate | 0.5 |
| Vinegar, 50 grain | 0.3 |
| FD&C yellow 5 color blend | 0.3 |
| Yeast | 0.25 |
| Sodium citrate | 0.2 |
| DATEM ester blend | 0.2 |
| FD&C yellow 6 blend | 0.05 |
| Caramel color | 0.0015 |
| Carageenan | 0.03 |

Example 2

An aseptic premium cheese sauce is prepared from the ingredients shown in Table 2 by adding them to the water at 50° C. in a high shear mixer in the following order of addition: The phosphate and citrate are added first followed by the sodium chloride, DATEM esters, carrageenan and cheese and mixed until the cheese is fully dissolved. Oil is added and then starch with 5 minutes blending. Afterwards, the vinegar, colors and flavors are added and mixed until fully homogeneous. The complete mixture is homogenized at 50° C. and 200 psi (14 bar). Afterwards, the homogenized mixture is processed at 137° C. for a residence time of 20 seconds and cooled to 35° C. and finally filled aseptically to provide a shelf-stable finished cheese sauce product.

TABLE 2

Aseptic Premium Cheese Sauce

| Ingredient | % of Batch |
| --- | --- |
| Water | 62.099 |
| Cheese | 20 |
| Modified waxy maize starch | 4.2 |
| Soybean oil | 8 |
| Salt | 0.7 |
| Unmodified waxy maize starch | 1 |
| Disodium phosphate | 0.75 |
| Sodium citrate | 0.25 |
| Cheese flavor | 0.85 |
| Vinegar, 50 grain | 1.5 |
| DATEM esters | 0.2 |
| FD&C Yellow #6 blend | 0.058 |
| Carageenan | 0.01 |
| FD&C Yellow #5 blend | 0.383 |

Example 3

A cheese sauce is prepared from similar ingredients to those listed in Table 1 but in this case, a prehydrated starch slurry is homogenized separately and added to the blend indicated in Example 1. The blend additions are carried out in the stated sequence of Example 1 and the mixture is aseptically processed as in Example 1 without further homogenization to provide a shelf-stable finished cheese sauce product.

What is claimed is:

1. A process for the preparation of a cheese sauce which comprises homogenizing a modified starch or a mixture of modified and unmodified starch containing up to about 40% by weight of unmodified starch based on the weight of the mixture of the starches, and blending the homogenized starch with cheese and other ingredients of a cheese sauce to produce an oil in water emulsion containing, based on the weight of the sauce, from about 1 to 25% by weight of cheese and from about 3 to 10% by weight of the homogenized starches, wherein said homogenization is performed below the gelatinization temperature of the starch or starch mixture.

2. A process according to claim 1 wherein the homogenization is carried out at a pressure of from about 100 to 2000 psi (7 to 140 bar).

3. A process according to claim 1 wherein the blend of ingredients to be homogenized comprises either the starch alone or any combination of starch and other ingredients.

4. A process for the preparation of a cheese sauce which comprises blending a modified starch or a mixture of modified and unmodified starch containing from about 5 to 40% by weight of unmodified starch based on the weight of the mixture of the starches, with cheese and other ingredients of a cheese sauce and homogenizing the blend to produce an oil in water emulsion containing, based on the weight of the sauce, from about 1 to 25% by weight of cheese and from about 3 to 10% by weight of the starches, wherein said homogenization is performed below the gelatinization temperature of the starch or starch mixture.

5. A process for the preparation of a cheese sauce which comprises blending a modified starch or a mixture of modified and unmodified starch containing from about 5 to 40% by weight of unmodified starch based on the weight of the mixture of the starches with other ingredients of a cheese sauce except the cheese, homogenizing the blend and blending the homogenized mixture with the cheese to produce an oil in water emulsion containing, based on the weight of the sauce, from about 1 to 25% by weight of cheese and from about 3 to 10% by weight of the starches, wherein said homogenization is performed below the gelatinization temperature of the starch or starch mixture.

\* \* \* \* \*